Jan. 9, 1962 A. E. RINEER 3,016,019
FLUID POWER CONVERTER
Filed Feb. 18, 1957 2 Sheets-Sheet 1
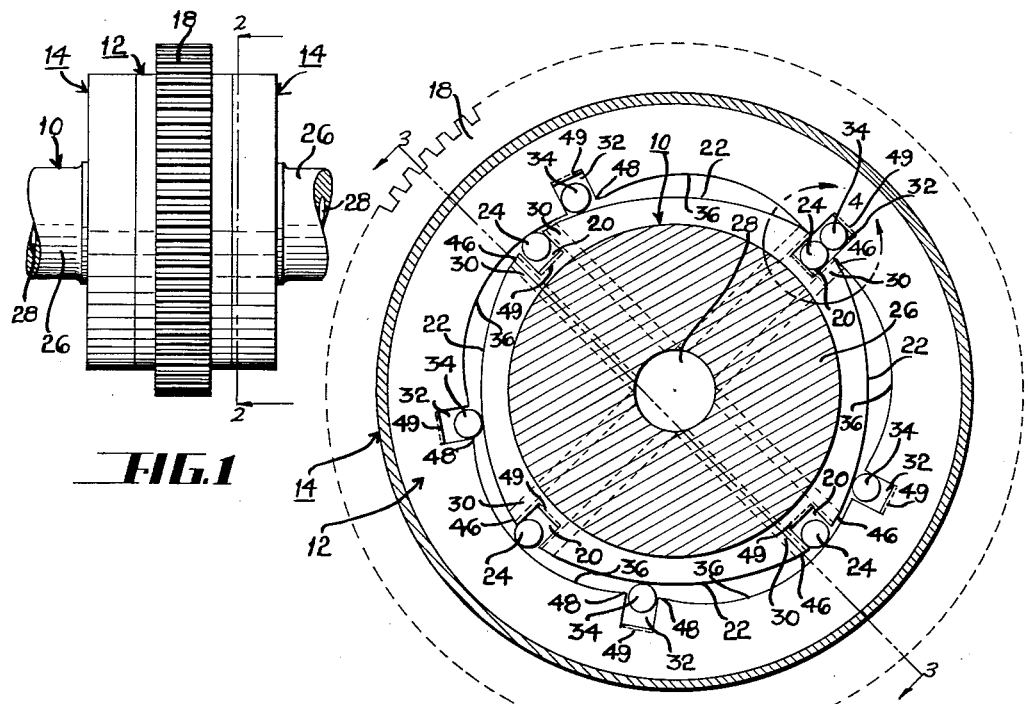
FIG.1
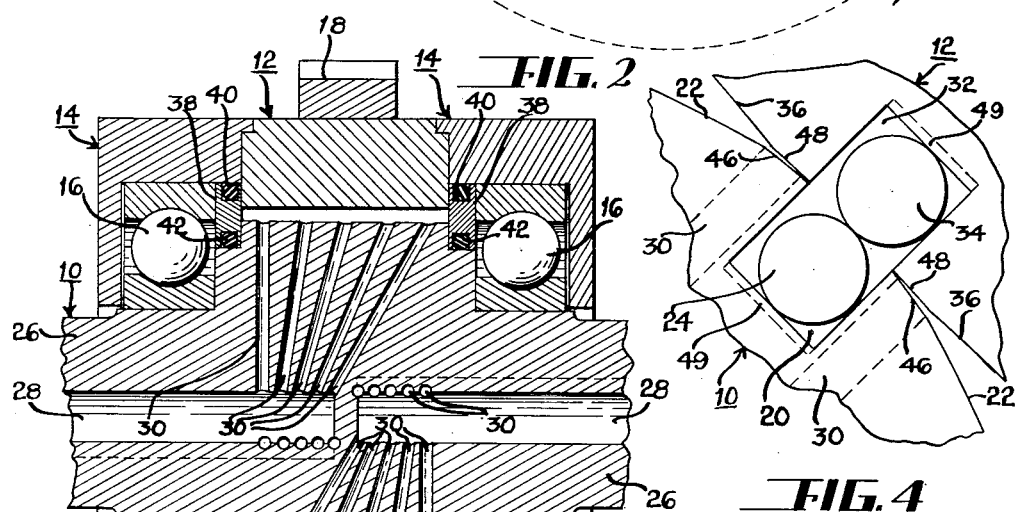
FIG.2
FIG.3
FIG.4
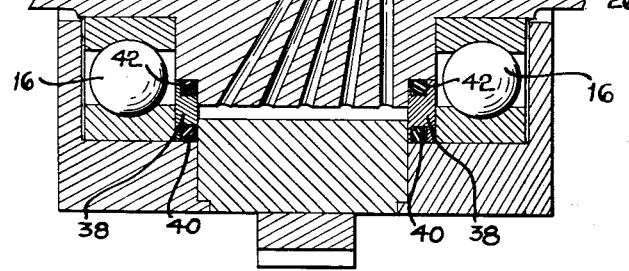
INVENTOR.
ARTHUR E. RINEER
BY
HIS ATTORNEYS Jan. 9, 1962 A. E. RINEER 3,016,019
FLUID POWER CONVERTER
Filed Feb. 18, 1957 2 Sheets-Sheet 2

INVENTOR.
ARTHUR E. RINEER
BY
HIS ATTORNEYS

United States Patent Office 3,016,019
Patented Jan. 9, 1962

3,016,019
FLUID POWER CONVERTER
Arthur E. Rineer, 41 East Drive, Centerville, Ohio
Filed Feb. 18, 1957, Ser. No. 640,918
26 Claims. (Cl. 103—121)

This invention relates to a fluid power converter, wherein power from a fluid under pressure may be converted to mechanical power and vice versa, and more particularly to improvements in my copending application, Serial No. 595,372, filed July 2, 1956, and entitled Fluid Power Converter, although the invention is not necessarily so limited.

An object of this invention is to provide a fluid power converter wherein cylindrical valves seated in response to fluid pressure within the power converter are employed for the purpose of converting fluid power to mechanical power and vice versa, and wherein the contour of the surfaces engaged by the cylindrical valves have been modified so as to minimize pulsation and to substantially eliminate noises generated by the movement of the valves.

Another object of this invention is to provide a fluid power converter having a stationary outer member or housing, and a rotor or impeller journalled for rotation within the housing, wherein novel annular manifolds are employed for conducting fluid to and from the chamber or chambers of the housing in which the rotor or impeller operates.

Still another object of this invention is to provide a fluid power converter comprising relatively rotatable inner and outer substantially cylindrical members having contoured surfaces facing an annular interspace therebetween and cylindrical valve members seated within the contoured surfaces, wherein said valves operate to partition the annular interspace in response to a flow of fluid in said interspace, and wherein novel fluid conduit means are provided for selectively positioning the cylindrical valves in operative and non-operative positions such that the device may be thrown into a non-operative or free wheeling condition at any time during its operation.

A further object of this invention is to provide a fluid power converter wherein magnetic means are employed for biasing the valves in a predetermined direction in the power converter so as to give the power converter predetermined operating characteristics. The magnetic means may be employed to convert the fluid power converter from a non-self-priming fluid pump to a self-priming fluid pump. Additionally, the magnetic means may be employed for the purpose of making the power converter free wheeling or inoperative under preselected conditions of operation.

Still a further object of this invention is to provide a fluid power converter of improved construction wherein frictional wear at critical points of the device has been minimized.

Other objects and advantages reside in the construction of parts, the combination thereof, the method of manufacture and the mode of operation, as will become more apparent from the following description.

In the drawings, FIGURE 1 is an elevational view of one embodiment of the fluid power converter of this invention, wherein the housing or outer member of the fluid power converter is adapted to rotate upon the inner member of the fluid power converter.

FIGURE 2 is an enlarged sectional view taken substantially along the line 2—2 of FIGURE 1.

FIGURE 3 is an enlarged sectional view taken substantially along the line 3—3 of FIGURE 2.

FIGURE 4 is a greatly enlarged detail view of the area of FIGURE 2 bounded by the arcuate line 4.

Figure 5:
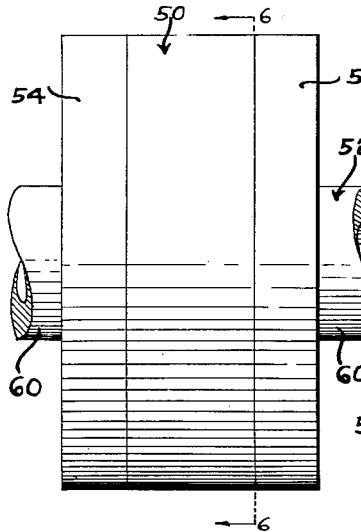
FIGURE 5 is an elevational view of a modification of the fluid power converter illustrated in FIGURE 1, wherein the outer member or housing is adapted to remain stationary and wherein the inner member is journalled for rotation within the housing.

Referring to the drawings in detail, one embodiment of the fluid power converter is illustrated in FIGURES 1–4. As best seen in FIGURE 3 this embodiment comprises a stationary inner body member 10, herein referred to as the stator, and an outer body member or annulus 12, herein referred to as the rotor, encircling the stator 10, and a pair of end plates or end caps 14 secured to the rotor 12, by means not shown, and mounted for rotation upon the stator 10 upon ring bearings 16.

As clearly illustrated in the drawings, the rotor 12 is provided with an annular outer ring gear 18 through which mechanical power may be transferred to and from the rotor.

Referring to FIGURE 2 of the drawings, the stator 10 is provided with a contoured surface at the periphery thereof, which surface includes four equispaced channels 20 extending axially of the stator, each having substantially a rectangular cross-section.

These channels 20 open to the surface of the stator at a distance from the geometric center of the stator defined as the pitch radius. These four channels 20 divide the periphery of the stator into four sectors 22, each of which is recessed away from the pitch radius in a manner which will be more fully described hereinafter.

Seated within each channel 20 is a cylindrical valve or vane 24 having a diameter just slightly less than the depth of the channel and materially less than the width of the channel such that each valve 24 may reciprocate freely in the channel in a radial direction. It is to be noted that these vanes are not subjected to any mechanical bias such as a spring bias, hence may be characterized as floatably mounted.

As illustrated in FIGURE 3, the stator 10 is provided with oppositely extending axles 26, each of which is bored in an axial direction to provide a fluid manifold 28. Conduits 30 extend substantially radially from the manifolds 28 to the periphery of the stator, there being one set of conduits 30 opening to the periphery of the stator adjacent one side of each channel 20 therein connecting to one of the manifolds 28 and another set of conduits 30 opening to the periphery of the stator on the other side of each channel 20 connecting to the other manifold 28. As will become more apparent from the following, one of the manifolds 28 may be utilized as an inlet manifold, while the other manifold 28 may be used as an outlet manifold, such that there will be a fluid inlet and a fluid outlet adjacent each channel 20 in the stator, all of the inlets being on the clockwise side of each channel and all of the outlets being on the counterclockwise side of each channel, or vice versa.

Referring now to the rotor 12, as illustrated in FIGURE 2, the rotor is provided with five equispaced axially extending channels 32 of substantially rectangular cross-section opening to the inner periphery of the rotor 12 and therefore being disposed in opposing relation to the channels 20 in the stator 10. Seated within each of the channels 32 is a cylindrical valve or vane 34, identical in construction to the valve 24 and adapted to reciprocate freely in the channels 32 of the rotor in a radial direction. These five equispaced channels 32 open to the inner periphery of the rotor at a distance from the geometric center of the rotor, equal substantially to the pitch radius as defined hereinbefore. In actual construction the channels 20 and 32 in the stator and rotor respectively are spaced very slightly away from one another, such that the rotor may rotate freely upon the stator. However, for the purposes of description, these channels are described as each opening to the same radial position, namely the pitch radius. It may be said, for example, that the rotor and stator are disposed on opposite sides of a surface of revolution, namely, the imaginary cylindrical surface which separates the two members.

The five channels 32 of the rotor 12 divide the inner surface of the rotor into five sectors 36, each of which is recessed outwardly from the pitch radius, as will be described more fully hereinafter.

In construction of the device, the rotor, stator, and end plates are preferably of metallic construction, such as aluminum and/or steel, and the valves are preferably a plastic, such as nylon or Teflon.

The departure in radial direction from the pitch radius of the sectors 22 and 36 is less than the radius of the valves 34 and 24, respectively. These sectors 22 and 36 cooperate to provide a plurality of axially extending fluid chambers between the rotor 12 and the stator 10. These chambers are made fluid tight by the provision of annular wear plates 38 abutting the opposite ends of the rotor 12 and recessed into the opposite margins of the stator 10 at the periphery thereof. These wear plates 38 are preferably made of a metallic material having a harder surface than the rotor and stator. Annular O-rings 40 and 42 are recessed in suitable channels in the wear plates 38 at radially opposed positions therein, so as to form fluid seals between the wear plates and the end caps 14, on the one side, and between the wear plates and the stator 10 on the other side.

The length of the cylindrical valves 24 and 34 extending axially between the wear plates 38 is such that the ends of the valves lie in very close proximity to the wear plates 38 without binding therebetween. With this construction a fluid seal is maintained between the ends of the cylindrical valves 24 and 34 and the wear plates 38.

The operation of the embodiment of FIGURES 1–4 as a motor is substantially as follows: Assume that a fluid under pressure is introduced into the manifold to the left of the power converter, as viewed in FIGURE 3. This fluid will flow radially outwardly to the periphery of the stator emerging from the stator 10 on the counterclockwise side of the channels 20 therein, as viewed in FIGURE 2. Initially, this fluid will tend to flow in either circumferential direction around the periphery of the stator 10. As the fluid flows across the channels 20, the valves 24 within the channels 20 are drawn radially outwardly of the stator 10 into engagement with the inner periphery of the rotor 12 through a venturi effect, as described in my copending application, Serial No. 595,372. Similarly, as the fluid crosses the channels 32 in the rotor, the valves 34 therein are drawn radially inwardly in engagement with the periphery of the stator through a venturi effect.

When the valves 24 and 34 have been seated upon the opposing surfaces of the rotor and stator respectively, the pressure within the axially extending chambers between the rotor and stator communicating with the fluid inlets rises. With the rise in pressure, the rotor, as viewed in FIGURE 2, will be driven in a counterclockwise direction with a torque proportional to the fluid pressure developed within the power converter. As the rotor 12 rotates in a counterclockwise direction, fluid is transported from the inlets on the counterclockwise side of each channel 20 of the stator to the fluid outlets on the clockwise side of each channel 20, the fluid moving in a counterclockwise direction across the surface of each sector 22 of the stator. As the fluid reaches the fluid outlets, it flows radially inwardly of the stator then out of the stator through the manifold 28 disposed to the right of the stator, as viewed in FIGURE 3. In this manner the pressure of the fluid flowing into the power converter is converted to a mechanical torque delivered to the rotor 12.

The operation of the power converter as a pump is the converse of the operation of the power converter as a motor. By impressing a mechanical torque upon the rotor 12, the rotor is constrained to rotate relative to the stator 10. If the chambers between the rotor and stator are initially filled with a fluid, that is primed, a venturi effect will be created at the surface of each channel 20 and 32, such that the valves 24 and 34 will be drawn into engagement with the opposing surfaces of the rotor and stator respectively. When this contact is effected, fluid will be propelled from fluid inlets to fluid outlets across the surface of each sector 22 of the stator in a manner analogous to the movement of fluid when the power converter is operated as a motor.

The fluid pressure developed and the volume delivered by the power converter when operated as a pump and the torque output and volume consumption of the fluid power converter when operated as a motor has been discussed in detail in my copending application, Serial No. 595,372.

The power converter, as described herein, operates with maximum efficiency when the central angle between adjacent valves 34 of the rotor equals the central angle at the periphery of the stator between the fluid inlet and outlet conduits 30 in each sector 22 of the stator.

As the rotor 12 rotates about the stator 10 in either the clockwise or counterclockwise direction, the valves 34 of the rotor wipe successively across a fluid outlet, a channel 20 and valve 24, a fluid inlet, the surface of a sector 22, a fluid outlet, and so on. Power is delivered through each valve 34 only during the time it moves across each sector 22 from a fluid inlet to a fluid outlet. It is during this movement that it is most important to establish an adequate fluid seal between the valves 34 and the surface of the stator 10.

It has been noted in connection with the fluid power converter, as described in my copending application, Serial No. 595,372, wherein the sectors 22 of the stator are cut on a smooth arc having a radius of curvature exceeding the pitch radius, that as the valves 34 of the rotor cross the inlet openings from the conduits 30, the incoming fluid pressure at these openings is sufficient to lift the valves 34 from the surface of the stator, such that the valves 34 bounce upon the surface of the stator after crossing each set of inlets 30. At high operating pressures, the impact as the valves 34 contact the surface of the stator is sufficient to generate considerable noise. Furthermore, at high operating speeds, the valves 34 may be driven a considerable distance relative to the surface of the stator 10 before they reengage the surface of the stator after crossing the fluid inlet ports. The result is, first, a loss in efficiency due to a leakage of fluid under the valves 34 as each valve crosses the fluid inlets and, second, a pulsation in the output of the power converter due to the momentary decrease in output torque caused by the leakage as the valves 34 of the rotor pass over the fluid inlets 30. The construction of the present device is such as to eliminate these objectionable features.

Referring in detail to FIGURE 4 of the drawings, it will be noted that the surface of the stator adjacent the channels 20 therein is provided with lands 46 following the pitch radius in both the counterclockwise and clockwise direction away from the channel 20 to a point beyond the margins of the fluid inlet and outlet conduits 30. Thereafter, each sector 22 of the stator follows a radius of curvature exceeding the pitch radius, such that the surface of each sector 22 is recessed away from the pitch radius. The result of this contouring is that, as the valves 34 engage the periphery of the stator 10 and advance over the fluid inlets 30 adjacent the channels 20 in the stator 10, the valves 34 cannot be driven away from the surface of the stator 10 any appreciable distance. The dimensions are such that the valves 34 are not free to bounce over the fluid inlets 30 and having once crossed the fluid inlets 30 are immediately in substantial engagement with the surface of the stator 10 such that a fluid seal between the valves 34 and the stator 10 is almost instantaneously effected.

This construction has been found to substantially eliminate the noise, torque losses, and efficiency losses encountered in the fluid power converter described in my copending application, Serial No. 595,372.

As illustrated in FIGURE 2 of the drawings, and as is apparent in FIGURE 4 of the drawings, the inner periphery of the rotor 12 is similarly contoured to provide lands 48 occupying the pitch radius adjacent the opposite side of the channels 32 therein. These lands 48 have no important function in the present embodiment, however, as will be described hereinafter in connection with the second embodiment of this invention illustrated in FIGURES 5–7, these lands 48 can perform the equivalent function of the lands 46 of the stator 10 in the event it is desired to reverse the roll of the rotor 12 to that of the stator and to provide the fluid inlets and outlets in the converted rotor. That is, the rotor of the present embodiment requires only the provision of appropriate fluid inlet and outlet conduits, in a manner which will be described hereinafter, for conversion to use as a stator.

In connection with the present embodiment, it should be emphasized that the valves 24, on the one hand, and the valves 34, on the other hand, need not be of the same diameter. It is sufficient that the radius of the valves 24 exceeds the radial departure from the pitch diameter of the surfaces of the sectors 36 of the rotor 12, and that the radius of the valves 34 exceeds the radial departure from the pitch radius of the sectors 22 of the stator 10.

It is further to be noted, in connection with the present embodiment, that as the valves 24 and 34 pass one over the other, as illustrated in detail in FIGURE 4, the outer valves will be prone to make a two point contact within their respective channels, one point of contact being with the bottom of the channel and the other point of contact being with one wall of the channel. Due to the fact that fluid will be trapped in a substantially fluid tight chamber between the valve and the channel in one corner of the channel, a considerable amount of force will then be required to remove the valve from the channel. It is apparent that the amount of force required to remove the valve out of the channel will determine the minimum inlet pressure at which the power converter will operate as a motor and the minimum rotor velocity at which the power converter will operate as a pump. For optimum flexibility of operation of the power converter it is desirable that these minimum valves be as low as possible. Accordingly, it is found advantageous to rout the bottoms of the channels 20 and 32, respectively, at spaced intervals to provide fluid ports under the valves so as to prevent entrapment of the valves within their respective channels. These ports are illustrated at 49 in FIGURES 2 and 4.

Figure 6:
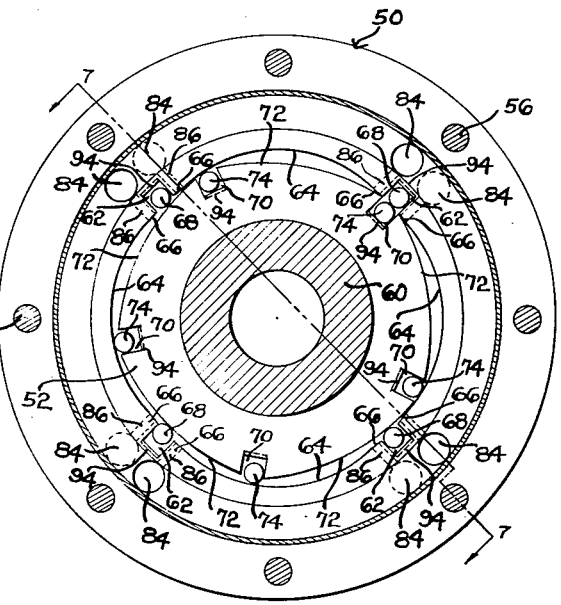
FIGURE 6 is an enlarged sectional view taken substantially along the line 6—6 of FIGURE 5.
Figure 7:
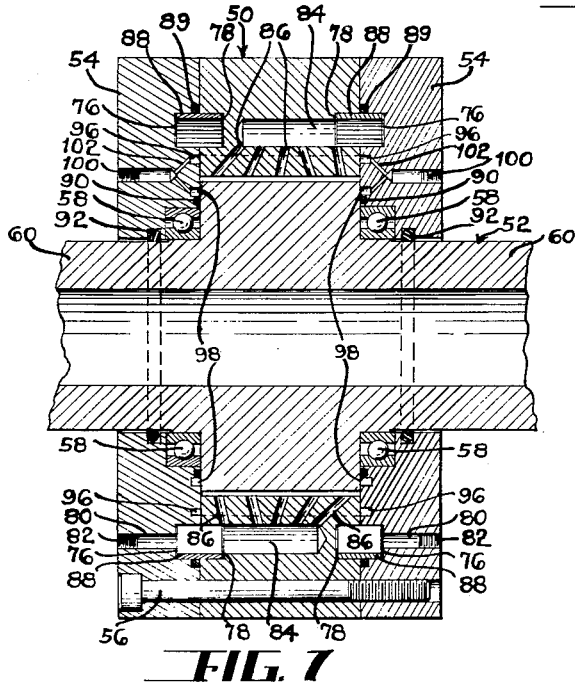
FIGURE 7 is a sectional view taken substantially along the line 7—7 of FIGURE 6, illustrating, in addition, a modification.

A second embodiment of the power converter of this invention is illustrated in FIGURES 5–7. In this embodiment the outer member 50 of the power converter functions as a stator and the inner member 52 of the power converter functions as a rotor. The rotor is supported in concentric relation to the stator by end plates 54, there being one end plate 54 secured to each end of the stator 50 by suitable bolts 56. These end plates support ring bearings 58, these bearings providing journals for oppositely projecting axles 60 of the rotor. As illustrated in the figures, these axles 60 may be tubular, so as to reduce the weight of the rotor.

As best illustrated in FIGURE 6, the stator 50 is provided with four equispaced axially extending channels 62 opening to the inner periphery of the stator at a distance from the geometric center of the stator defined as the pitch radius. These channels 62 divide the inner periphery of the stator into four sectors 64, each of which is recessed away from the pitch radius. As in the first embodiment, lands 66 following the pitch radius are provided on each side of the channel 62 in the stator. A cylindrical valve 68 is seated in each channel 62, the valves 68 having a diameter slightly less than the depth of the channels 62 and materially less than the width of the channels 62.

The rotor 52 is provided with five equispaced axially extending channels 70 in the periphery thereof, these channels opening to the periphery of the rotor at substantially the pitch radius as defined hereinbefore. These channels 70 divide the periphery of the rotor 52 into five sectors 72, each of which is cut on a radius of curvature exceeding the pitch radius so as to be recessed within the pitch radius. Lands, analogous to the lands 66 of the stator, are not provided nor are they necessary for the rotor 52. Valves 74 having a diameter slightly less than the depth of the channels 70 and materially less than the width of the channels 70 are seated in the channels 70. As is the case of the first embodiment, the radius of the valves 74 exceeds the radial departure of the sectors 64 of the stator from the pitch radius and similarly the radius of the valves 68 exceeds the radial departure of the sectors 72 of the rotor from the pitch radius.

Fluid is conveyed to and from the power converter in the following manner. Annular channels 76, having a diameter exceeding substantially the pitch diameter of the power converter, are provided on the inner face of each end plate 54. Opposite each annular channel 76, in the opposite ends of the stator 50, are provided mating annular channels 78. These channels 76 and 78 cooperate to provide annular inlet and outlet manifolds for the fluid power converter, these manifolds being designated primary manifolds. These primary manifolds connect to the exterior of the power converter through suitable conduits 80, as illustrated in FIGURE 7, passing substantially axially through the body of the end plates 54. The outer ends of these conduits 80 are internally threaded at 82 for connection with suitable fittings. The primary manifolds connect to the periphery of the stator through secondary manifolds 84 bored in axial positions in the body of the stator, as illustrated in FIGURE 7, which in turn communicate with substantially radial conduits 86 extending between the secondary manifolds 84 and the lands 66 of the stator. As is apparent in FIGURES 6 and 7, one of the primary manifolds formed by the annular channels 76 and 78 between one end plate 54 and the stator 50 communicates through secondary manifolds 84 and conduits 86 to the counterclockwise side of each channel 62 in the stator, and the other of the primary manifolds communicates through secondary manifolds 84 and conduits 86 to the clockwise side of each channel 62 in the stator. In the operation of the device as a motor or a pump, either primary manifold may serve as an inlet or an outlet manifold for the power converter.

To minimize possible leakage of fluid from the primary manifolds out of the power converter along the interface between the end plates 54 and the stator 50, an annular plate 88 is provided along the outer periphery of each primary manifold. Each plate 88 is backed with an annular O-ring seal 89 recessed in a suitable channel in the adjacent end plate 54. Similarly, leakage of fluid along the interfaces between the end plates 54 and the rotor 52 is obstructed by providing suitable annular O-ring seals 90 and 92 along the radial and axial interfaces respectively.

The operation of this second modification of the fluid power converter is substantially identical with that of the first embodiment with the exception, of course, that in this second modification the inner member or rotor 52 rotates in response to a fluid pressure in one of the primary manifolds.

It is to be emphasized herein that in both the embodiment of FIGURES 1-4 and the modification of FIGURES 5-7 the fluid power converter may be constructed with any number of equispaced valves or channels in the rotor and in the stator, provided there is at least one channel and associated fluid inlets, fluid outlets, and valve in the stator and provided there is at least one more channel and associated valve in the rotor than is provided in the stator.

As was the case with the embodiment of FIGURES 1-4 it is found advantageous to rout out the bottoms of channels 62 and 70 of the second modification at spaced intervals as illustrated at 94 in FIGURE 6.

FIGURE 7 illustrates a modification wherein the routed out portions of the channels 62 and 70 may be omitted. This modification will now be described in detail.

As illustrated in FIGURE 7, the end plates 54 of the second modification are each provided with spaced concentric annular channels 96 and 98 in the inner face thereof. The outer channels 96 are positioned at a radius with respect to the geometric center of the stator, such that these channels communicate with the bottoms of the channels 62 in the stator. The radial width of the channels 96 is less than the radius of the valves 68 seated in the channels 62, the arrangement being such that the annular channels 96 communicate with the several channels 62 in the stator at a depth exceeding the radius of the valves 68 seated in the channels 62. Analogously, the inner annular channels 98 in the end plates 54 communicate with the channels 70 of the rotor at a depth in the channels 70 exceeding the radius of the valves 74 positioned therein, these channels 98 having a radial thickness which is less than the radius of the valves 74. In each end plate 54 an axially extending boring 100 communicates from the exterior of the power converter through conduits 102 with both annular channels 96 and 98. The borings 100 are each internally threaded adjacent the surfaces of the end plates 54 so that a suitable fitting can be connected thereto.

A fluid circuit external to the power converter is employed for connecting the borings 100 selectively to the fluid inlet for the power converter or to the fluid outlet for the power converter. When both borings 100 are connected to the fluid inlet for the power converter and when the power converter is operated as a motor, such that fluid under pressure is supplied to the device, the annular channels 96 and 98 of the power converter will be connected to the fluid under pressure such that a fluid under pressure is introduced into the bottoms of the channels 62 and 70 of the rotor and stator. This fluid will tend to flow out of the channels carrying with it the valves 68 and 74 seated in these channels and will, in this manner, aid in rapidly moving the valves into operative positions in engagement with the opposing surfaces of the rotor and stator respectively. When these valves move into their respective operative positions, they form a fluid seal against the fluid pressure and accordingly there is no contribution to leakage of fluid by the provision of the annular channels 96 and 98 in the end plates.

If during the time that the device is in operation as a motor, the borings 100 in the end plates 54 are disconnected from the fluid inlet and connected to the fluid outlet from the power converter, the annular channels 96 and 98 in the end plates will then connect to a source of fluid under comparatively low pressure, such that there will be a tendency for fluid to leak from the fluid inlets of the motor into the channels 62 and 70 of the motor and then out through the borings 100. This flow of fluid will almost instantaneously draw the valves 68 and 74 away from the surfaces of the stator and rotor respectively into the channels 62 and 70, such that the valves are then inoperative. In this condition, although the power converter is still connected to a source of fluid under pressure, the device is wholly inoperative and free wheeling.

If the borings 100 are subsequently reconnected to the fluid inlet such that they connect with source of fluid under pressure, the device returns to normal operation as a motor. Clearly, the use of the auxiliary fluid circuit including the annular channels 96 and 98 obviates the necessity of routing out of the channels 62 and 70.

When the power converter is to be operated as a pump, neither the fluid inlet nor the fluid outlet of the device is connected to a source of fluid under pressure and the valves 68 and 74 of the power converter can be seated ordinarily only when mechanical rotation is impressed upon the rotor, such that the rotor is rotated at a relatively high speed so as to establish a venturi effect adjacent the channels. The speed at which the rotor must be rotated to seat the valves and thus establish pumping action is dependent upon the viscosity of the fluid with which the device is initially primed.

It will be apparent, however, that by momentarily connecting the borings 100 of the power converter to a source of fluid under pressure, the valves may be readily seated even though the rotor of the power converter is not driven mechanically. Thus, when the power converter is to be operated as a pump, the circuit including the annular channels 96 and 98 in the end plates 54 may be employed to pre-seat the valves 68 and 74 of the power converter, such that the power converter is self-priming and operative as a pump at low speeds immediately when the rotor is mechanically rotated.

Once the operation of the power converter as a pump has been established, the borings 100 may be connected to the fluid outlet or high pressure side of the pump for continuous operation of the device as a pump. If the borings 100 are connected to the fluid inlet or low pressure side of the pump, it is apparent that the operation of the device as a pump will cease and the device will slip into a free wheeling condition in a manner analogous to the free wheeling condition obtained when the device is operated as a motor.

Thus, the auxiliary circuit including the annular channels 96 and 98 may be used in general for modifying the operation of the device when the device is operated as a motor to create a free wheeling effect, and when the device is operated as a pump to create first, a self-priming effect and second, a free wheeling effect.

It will be apparent to one skilled in the art that with the provision of the annular channels 96 and 98, it becomes unnecessary to provide clearance between the valves 68 and 74 and the side walls of their respective channels 62 and 70. That is, provision for the passage of fluid into the channels 62 and 70 behind the valves 68 and 74 need not be made. When the valves 68 and 74 are dimensioned to precisely fit the channels 62 and 70, and when the borings 100 are stopped up, the following novel operating characteristic results.

The annular channels 96 and 98 are then each part of a closed fluid circuit. Since the valves 68, on the one hand, and 74, on the other hand, reciprocate in their respective channels in a symmetric manner as the rotor rotates relative to the stator, the volume of this closed circuit remains substantially constant such that the movement of any one valve radially in its channel induces an opposite radial movement of the other valves interconnected by means of the annular channel 96 or 98. Thus, through the interconnection of the annular channels 96 and 98, the valves 68 on the one hand, and 74, on the other hand tend to seat one another as the rotor rotates. This novel characteristic can be employed effectively in making the power converter self-priming as a pump, particularly where comparatively viscous fluids are to be pumped.

Figure 8:
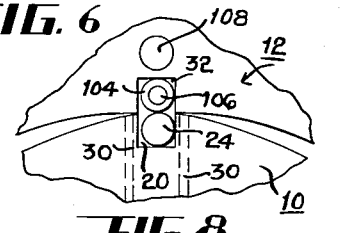
FIGURE 8 is a greatly enlarged detail view analogous to that of FIGURE 4 showing another modification.
Figure 9:
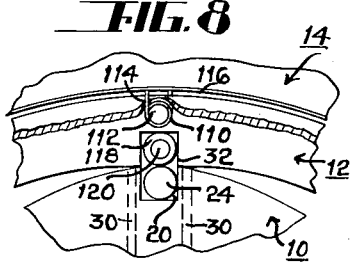
FIGURE 9 is a greatly enlarged detail view analogous to that of FIGURE 4 showing still another modification.

FIGURES 8 and 9 of the drawing, illustrate modifications of the power converter wherein similar effects are obtained through the use of magnets. Referring to FIGURE 8 a portion of the stator 10 and the rotor 12 of the power converter of FIGURES 1–4 is illustrated. In a channel 20 within the stator 10 is positioned a valve 24, and in a channel 32 of the rotor 12 is positioned a valve 104 having a cylindrical permanent magnet core 106. In this embodiment the valve 104 may be plastic with the core 106 being an axially magnetized alnico magnet, or the like. Adjacent the bottom of the channel 32 in the rotor 12 is positioned a permanent magnet 108.

It is apparent that if the magnets 106 and 108 are in opposition, the valve 104 will be driven radially in the channel 32 in the direction of the surface of the stator 10. Thus, the magnets 106 and 108 may be employed to exert a force tending to pre-seat the valve 104. This construction has particular utility in the power converter when the power converter is to be adapted for use as a pump, the function of the magnets being to seat the valve 104, so that the device is operable as a pump immediately when the rotor is driven mechanically.

It should be emphasized that, as a practical matter, the seating of but one valve of the rotor will serve to start the operation of the device as a pump, although the device starts as a pump more efficiently when all of the valves are pre-seated with magnets. It is unnecessary to simultaneously pre-seat the valves in the stator for the reason that the seating of the valves in the rotor creates a sufficient flow of fluid in the power converter upon mechanical rotation of the rotor to very quickly seat the valves of the stator.

With regard to the modification of FIGURE 8, it is apparent that if the permanent magnets 106 and 108 were not placed in opposition, but rather attracted one another, the device would be permanently free wheeling whether operated as a motor or a pump and as such would serve no useful purpose.

FIGURE 9 shows still another modification. The figure illustrates a fragmentary end view of the power converter of FIGURE 1 with the end cap 14 broken away to reveal the structure of the stator 10 and rotor 12. In this modification an axial boring penetrating the end plates 14 and rotor 12 is filled with a solenoid 110 having a ferromagnetic core 112 of low retentivity. Electric connection to the solenoid 110 is established through leads 114 on opposite ends of the solenoid which connect with annular slip ring contacts 116 disposed on the faces of the end plates 14. Within a channel 20 of the stator 10 is positioned a valve 24. Within a channel 32 of the rotor 12 is positioned a valve 118 having a permanent magnet core 120. Means, not shown, are employed for selectively energizing the solenoid 110 so as to create a magnetic field which may attract or repel the permanent magnet 120.

When the magnetic field created by the solenoid 110 repels the permanent magnet 120, the valve 118 in the rotor of the device may be pre-seated, such that the device is a self-priming pump. When the polarity of the field of the solenoid 110 is reversed, such that the magnet 120 is attracted into the channel 32 of the rotor, the device whether operated as a pump or a motor is quickly thrown into a free wheeling condition. The modification of FIGURE 9 wherein one or more electromagnets is employed for biasing the valves of the rotor in a predetermined radial direction is analogous in flexibility of operation to the modification of FIGURE 7 wherein fluid means are employed for biasing the valves in a radial direction in their respective channels.

In the disclosed embodiments wherein the stator is provided with four valves and associated fluid inlets and outlets and wherein the rotor is provided with five valves, the device has the desirable characteristic of substantial uniformity of torque output when operated as a motor. However, an unbalance in the radial forces applied to the bearings interposed between the rotor and stator arises from the fact that diametrically opposite portions of the rotor are not subjected to equal and opposite radial forces when the device is in operation. Under some conditions of operation, this asymmetry of radial forces induces an objectionable vibration. The asymmetry can be eliminated by constructing the power converter with four valves and associated inlets and outlets in the stator and six equally spaced valves and sectors in the rotor. While this particular design is not illustrated herein, it is apparent that the inventions disclosed herein are applicable to the design and construction of such a power converter.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In a fluid power converter comprising in combination a rotor member and a stator member adapted to rotate one with respect to the other, one of said members being an inner member substantially cylindrical in shape and having a contoured surface at the periphery thereof, the other of said members being an outer member encircling said inner member, said outer member having a contoured surface at the inner periphery thereof opposing the contoured surface of said inner member and having a length equal substantially to that of said inner member, the maximum radius of said inner member being substantially equal to the minimum radius of said outer member, this radius being designated the pitch radius, plate means abutting the ends of said inner and outer members enclosing the interspace between said opposing contoured surfaces, said inner and outer members each having a plurality of axially extending equispaced channels in the contoured surface thereof opening to the interspace therebetween substantially at the pitch radius thereof, there being more channels in said rotor member than in said stator member, a plurality of elongate cylindrical valve members, there being one valve member extending axially and loosely seated in each said channel, the ends of said valve members lying in close proximity to said plate means, said channels dividing the contoured surfaces of said inner and outer members into sectors, the sectors of said inner member having a radius of curvature greater than the pitch radius and the sectors of said outer member having a radius of curvature less than the pitch radius whereby said sectors cooperate to provide a plurality of chambers between said inner and outer members, the maximum departure of the surface of each of said sectors from the pitch radius being less than the radius of each valve member seated in the channels of the opposing surface, and means providing a plurality of fluid inlet openings and fluid outlet openings in the contoured surface of said stator member, there being one fluid inlet opening adjacent one side of each channel in said stator member and one fluid outlet opening adjacent the other side of each channel of said stator member such that there is one fluid inlet opening and one fluid outlet opening in each sector of said stator member, the improvement wherein the portions of the contoured surface of said stator member bearing said fluid inlet openings and said fluid outlet openings have a radius of curvature equal substantially to the pitch radius.

2. The improvement according to claim 1 wherein each said plate means is provided with an annular channel therein communicating with the channels in the contoured surface of one of said members at a depth exceeding the radius of the valve members seated in said channels, and including means providing a fluid conduit leading from said annular channel to the exterior of said power converter.

3. The improvement according to claim 1 including means providing a fluid conduit communicating from the exterior of said power converter with one of the channels therein at a depth exceeding the radius of the valve member seated therein.

4. The improvement according to claim 1 wherein each said plate means is provided with a pair of spaced concentric annular channels therein, the outer of said annular channels communicating with the channels of said outer member at a depth exceeding the radius of the valves seated therein, and the inner of said annular channels communicating with the channels of said inner member at a depth exceeding the radius of the valves seated therein, and including fluid conduit means interconnecting the annular channels in each said plate means and communicating with the exterior of said power converter.

5. The improvement according to claim 1 including means providing fluid conduits communicating with each of the channels of one of said members at a depth exceeding the radius of the valve seated therein, said conduits communicating with the exterior of said power converter.

6. The improvement according to claim 1 including means providing fluid conduits communicating with each channel of said power converter at a depth exceeding the radius of the valve seated in the channel and leading to the exterior of said power converter.

7. The improvement according to claim 1 wherein said channels are of rectangular cross-section and wherein the bottom of each said channel is routed out at spaced intervals to provide fluid passages behind the valve seated therein when the valve abuts the bottom of the channel.

8. The improvement according to claim 1 wherein at least one valve seated in one of said members has a core of ferromagnetic material, and including means providing a magnetic field coacting with said core to urge said valve radially into contact with the contoured surface opposite the valve.

9. The improvement according to claim 1 wherein at least one valve seated in one of said members is provided with a core of ferromagnetic material permanently magnetized in an axial direction, and including means providing a reversible magnetic field coacting with said magnetic core to selectively urge said valve radially into and out of contact with the contoured surface opposite the valve.

10. The improvement according to claim 1 wherein each of the valves seated in one of said members has a core of ferromagnetic material permanently magnetized in an axial direction, and including means providing magnetic fields coacting with said magnetized cores to urge said valves in a predetermined direction radial with respect to the power converter.

11. The improvement according to claim 1 wherein said outer member is the stator member, and wherein said fluid inlet openings each communicate with one end of said stator member and said fluid outlet openings each communicate with the other end of said stator member, and wherein the one end of said stator member is provided with an annular inlet manifold communicating with each of said fluid inlet openings and the other end of said stator member is provided with an annular fluid outlet manifold communicating with each of said fluid outlet openings.

12. A fluid power converter comprising, in combination, an inner body member of substantially cylindrical shape having a contoured surface at the periphery thereof having a maximum radius designated the pitch radius, an outer body member encircling said inner body member having a length substantially equal to that of said inner body member and having an inner contoured surface opposing the contoured surface of said inner body member of minimum radius equal substantially to said pitch radius, said inner and outer body members being rotatable one with respect to the other about their common axis, plate means disposed at each end of said body members for enclosing the interspace between the contoured surfaces thereof, one of said body members, designated the stator, having a plurality of equispaced portions in the contoured surface thereof disposed at the pitch radius having a radius of curvature equal to the pitch radius, each said portion having an axially extending channel centrally disposed therein and opening to the interspace between said inner and outer body members, means providing a plurality of fluid inlet and outlet openings in the equispaced portions of said stator, there being one fluid inlet opening in each said portion disposed to one side of the channel therein and one fluid outlet opening in each said portion disposed to the other side of the channel therein, the arrangement being such that one fluid outlet and one fluid inlet is disposed between each pair of adjacent channels in said stator, the contoured surface of said stator being recessed away from the pitch radius between each pair of equispaced portions therein, the other of said body members, designated the rotor, having a plurality of equispaced axially extending channels therein opening at the pitch radius to the interspace between said body members, said rotor being recessed away from the pitch radius between each pair of adjacent channels therein, the number of channels in said rotor exceeding the number of channels in said stator, a plurality of valves extending axially between said plate means having a radial half-length exceeding the radial depth of the recessed portions of said stator, there being one of said valves seated for reciprocal radial movement in each said channel of said rotor, a plurality of like valves extending axially between said plate means having a radial half-length exceeding the radial depth of the recessed portions of said rotor, there being one of said valves seated for reciprocal radial movement in each channel of said stator, and means for urging each said valve radially into contact with the opposing contoured surface.

13. In a fluid power converter comprising, in combination, an inner body member of substantially cylindrical shape having a contoured surface at the periphery thereof having a maximum radius designated the pitch radius, an outer body member encircling said inner body member having a length substantially equal to that of said inner body member and having an inner contoured surface opposing the contoured surface of said outer body member of minimum radius equal substantially to said pitch radius, said inner and outer body members being rotatable one relative to the other about their common axis, plate means disposed at each end of said body members for enclosing the interspace between the contoured surfaces thereof, said body members each having a plurality of equispaced axially extending channels in the contoured surfaces thereof opening to the interspace therebetween at the pitch radius, one of said body members, designated the stator, having fewer channels therein than the other of said body members, designated the rotor, and a plurality of elongate cylindrical valve members, there being one said valve member seated loosely in each said channel and having the opposite ends thereof in close proximity to said plate means, said channels dividing the contoured surfaces of said body members into sectors, said sectors having the surfaces thereof recessed away from the pitch radius whereby a plurality of axially extending chambers are established in the interspace between said body members, said stator having a plurality of fluid inlet and fluid outlet openings in the contoured surface thereof, there being one fluid inlet opening adjacent one side of each channel therein and one fluid outlet opening adjacent the other side of each channel therein, the improvement wherein each said plate means is provided with an annular channel therein communicating with each of the channels of one of said body members at a depth therein exceeding the radius of the cylindrical valve seated therein, and including means providing a fluid conduit in each said plate means leading from the annular channel therein to the exterior thereof.

14. The improvement according to claim 13 wherein each said plate means is provided with a second annular channel therein communicating with the channels in the other body member at a depth therein exceeding the radius of the cylindrical valves seated therein, and wherein the fluid conduits in each said plate means interconnect the annular channels therein.

15. In a fluid power converter comprising, in combination, an inner body member of substantially cylindrical shape having a contoured surface at the periphery thereof having a maximum radius designated the pitch radius, an outer body member encircling said inner body member having a length substantially equal to that of said inner body member and having an inner contoured surface opposing the contoured surface of said outer body member of minimum radius equal substantially to said pitch radius, said inner and outer body members being rotatable one relative to the other about their common axis, plate means disposed at each end of said body members for enclosing the interspace between the contoured surfaces thereof, said body members each having a plurality of equispaced axially extending channels in the contoured surfaces thereof opening to the interspace therebetween at the pitch radius, one of said body members, designated the stator, having fewer channels therein than the other of said body members, designated the rotor, and a plurality of elongate cylindrical valve members, there being one said valve member seated loosely in each said channel and having the opposite ends thereof in close proximity to said plate means, said channels dividing the contoured surfaces of said body members into sectors, said sectors having the surfaces thereof recessed away from the pitch radius whereby a plurality of axially extending chambers is established in the interspace between said body members, said stator having a plurality of fluid inlet and fluid outlet openings in the contoured surface thereof, there being one fluid inlet opening adjacent one side of each channel therein and one fluid outlet opening adjacent the other side of each channel therein, the improvement including magnetic means exerting a force upon the valves in at least one of said members for biasing said valves radially in a predetermined direction in said channels.

16. The improvement according to claim 15 wherein said means includes a plurality of ferromagnetic bodies, there being one ferromagnetic body disposed in each valve in one of said body members, and means producing a magnetic field for biasing the movement of said ferromagnetic bodies.

17. The improvement according to claim 15 wherein said means includes a permanently magnetized ferromagnetic body disposed in each valve in one of said body members.

18. The improvement according to claim 15 wherein said means comprises a permanently magnetized ferromagnetic body disposed in each valve in one of said body members, and a permanently magnetized ferromagnetic body disposed adjacent each channel in the body member.

19. The improvement according to claim 15 wherein said means comprises a permanently magnetized ferromagnetic body disposed in each valve in one of said body members, an electromagnet disposed adjacent each channel in said body member, and means for conveying electrical energy to said electromagnets.

20. In a fluid power converter comprising a stator and a rotor, the relation of one to the other being such as to provide contiguous chambers about a pitch radius, said rotor having portions recessed away from the pitch radius to form chambers opposite said stator, said stator being provided with a plurality of equispaced channels opening at said pitch radius opposite said rotor, valve floatably disposed in said channels, fluid inlet means adjacent one side of each said channel, fluid outlet means adjacent the other side of each said channel, said valves seating against said rotor so as to partition and seal said chambers in response to fluid pressure transmitted to the chambers through said inlet means, the improvement wherein the portions of said stator intermediate the fluid inlet and fluid outlet means between each pair of adjacent channels of said stator are recessed away from said pitch radius, the remaining portions of said stator occupying the pitch radius, and including valves carried by said rotor for engaging the surface of said stator to further partition and seal said chambers, there being more valves in said rotor than in said stator.

21. In a fluid power converter comprising a stator and a rotor, the relation of one to the other being such as to provide contiguous chambers, said stator being provided with a plurality of equispaced channels adjacent said rotor, elongate substantially cylindrical vanes floatably disposed in said channels, there being one vane in each channel having a width less than that of the channel whereby a clearance is provided therebetween, fluid inlet means in said stator adjacent one side of each said channel, and fluid outlet means in said stator adjacent the other side of each said channel, the improvement including fluid conduit means connecting with said channels at a radial depth in each channel exceeding the radial half length of the vane disposed therein, the clearance between said vanes and said channels establishing communication between said conduit means and said chambers said fluid conduit means leading to the exterior of said power converter and being constructed and arranged for communication with a controlled and separate source of fluid power to regulate the movement of fluid in the clearance between said vanes and said channels.

22. In a fluid power converter comprising a stator and a rotor, the relation of one to the other being such as to provide contiguous chambers, said stator being provided with a plurality of equispaced channels adjacent said rotor, valves floatably disposed in said channels, fluid inlet means in said stator adjacent one side of each said channel, and fluid outlet means in said stator adjacent the other side of each said channel, said valves seating against said rotor so as to partition and seal said chambers in response to fluid pressure transmitted to the chambers through said inlet means, the improvement including a permanently magnetized ferromagnetic body disposed in each said valve, and electromagnet means disposed in said stator for creating a magnetic field of reversible polarity to bias said valves selectively in a radial direction.

23. In a fluid power converter comprising a stator and a rotor having opposing contoured walls, said contoured walls being disposed on opposite sides of a surface of revolution disposed therebetween, said rotor having portions recessed from said surface of revolution to form chambers opposite said stator, said stator being provided with a plurality of equispaced channels in the wall thereof adjacent said rotor, valves floatably disposed in said channels, means providing a fluid inlet to said chambers adjacent one side of each said channel, means providing a fluid outlet from said chambers adjacent the other side of each said channel, said valves seating against said rotor wall so as to partition and seal said chambers in response to fluid pressure transmitted to the chambers through said inlet means, the improvement wherein the wall of said stator intermediate the fluid inlet and the fluid outlet between each pair of adjacent channels of said stator is recessed from said surface of revolution, the remaining portions of said stator wall substantially occupying said surface of revolution, and including equispaced valves carried by said rotor projecting from the wall thereof for engaging the opposing wall of said stator to further partition and seal said chambers, there begin more valves in said rotor than in said stator.

24. In a fluid power converter comprising a stator and a rotor each having a contoured wall, the contoured walls being disposed on opposite sides of a surface of revolution disposed therebetween, the wall of said rotor having portions therein recessed away from said surface of revolution, said stator being provided with a plurality of equispaced channels in the wall thereof adjacent said rotor, elongate cylindrical valve members floatably disposed in said channels, means providing a fluid inlet to said chambers adjacent one side of each said channel, means providing a fluid outlet from said chambers adjacent the other side of each said channel, said valves having a diameter less than the width of said channels and seating against said rotor walls so as to partition and seal said chambers in response to fluid pressure transmitted to the chambers through said inlet means, the improvement wherein the wall of said stator intermediate the fluid inlet and the fluid outlet between each pair of adjacent channels of said stator is recessed from said surface of revolution, the remaining portions of said stator wall being contiguous with said surface of revolution, said rotor having a plurality of equispaced channels in the wall thereof adjacent said stator, and a plurality of elongate cylindrical valve members, one disposed in each channel of said rotor, said valve members each having a width less than that of the channels in said rotor.

25. A fluid power converter comprising, in combination an inner body member of substantially cylindrical shape having a contoured surface at the periphery thereof having a maximum radius designated the pitch radius, an outer body member encircling said inner body member having a length substantially equal to that of said inner body member and having an inner contoured surface opposing the contoured surface of said inner body member of minimum radius equal substantially to said pitch radius, said inner and outer body members being rotatable one with respect to the other about their common axis, plate means disposed at each end of said body members for enclosing the interspace between the contoured surfaces thereof, one of said members designated the stator having a plurality of equispaced portions in the contoured surface thereof disposed substantially at the pitch radius, each portion having a radius of curvature equal substantially to the pitch radius, each portion having a channel centrally disposed therein extending between said plate means and opening to the interspace between said inner and outer body members, means providing a plurality of fluid inlet and outlet openings in the equispaced portions of said stator, there being one fluid inlet opening in each said portion disposed to one side of the channel therein and one fluid outlet opening in each said portion disposed to the other side of the channel therein, the arrangement being such that one fluid inlet and one fluid outlet is disposed between each pair of adjacent channels in said stator, the contoured surface of said stator being recessed away from the pitch radius between each pair of equispaced portions therein, the other of said body members designated the rotor having a plurality of channels therein extending between said plate means and opening at the pitch radius to the interspace between said body members, said rotor being recessed away from the pitch radius between each pair of adjacent channels therein, a plurality of valves each having a width less than that of the channels of said rotor extending between said plate means in the channels of said rotor, said valves each having a radial half length exceeding the radial depth of the recessed portions of said stator, and a plurality of like valves each having a width less than that of the channels of said stator extending between said plate means in the channels of said stator, said like valves each having a radial half length exceeding the radial depth of the recessed portions of said rotor.

26. In a fluid power converter comprising an inner member and an outer member journalled one within the other for relative rotation, the relation of one to the other being such as to provide a fluid chamber therebetween, fluid inlet and outlet means providing a circumferential fluid flow in said chamber, one of said members having an axially disposed channel in the periphery thereof, and an elongate vane element floatably mounted in said channel and slidable between a position fully recessed in said channel and a position projecting out of said channel into said fluid chamber to react with the fluid therein, the improvement wherein said vane element has a width less than the width of said channel to provide clearance for fluid flow between the walls of said channel and said vane element, and fluid conduit means communicating with said channel behind the vane element therein leading to the exterior of said power converter and constructed and arranged for communication with a controlled and separate source of fluid pressure to regulate the movement of fluid in the clearance between the walls of said channel and the vane element.

References Cited in the file of this patent

UNITED STATES PATENTS

| | | |
|---|---|---|
| 727,749 | Cook | May 12, 1903 |
| 732,671 | Andrews | June 30, 1903 |
| 807,421 | Dickison | Dec. 12, 1905 |
| 855,590 | Ripberger | June 4, 1907 |
| 929,018 | Ripberger | July 29, 1909 |
| 1,271,585 | Klise | July 9, 1918 |
| 1,348,103 | George | July 27, 1920 |
| 1,424,977 | Bidwell | Aug. 8, 1922 |
| 1,451,284 | Voreaux et al. | Apr. 10, 1923 |
| 1,903,606 | Anderson | Apr. 11, 1933 |
| 2,035,465 | Erskine et al. | Mar. 31, 1936 |
| 2,392,029 | Davis | Jan. 1, 1946 |
| 2,620,053 | Lyman | Dec. 2, 1952 |
| 2,631,544 | Wilcox | Mar. 17, 1953 |
| 2,660,123 | Vlachos | Nov. 24, 1953 |
| 2,725,013 | Vlachos | Nov. 29, 1955 |
| 2,788,748 | Szczepanek | Apr. 16, 1957 |
| 2,913,994 | Purcell | Nov. 24, 1959 |

FOREIGN PATENTS

| | | |
|---|---|---|
| 41,438 | Germany | Dec. 6, 1887 |
| 1,009,728 | France | Mar. 12, 1952 |
| 1,117,494 | France | Feb. 23, 1956 |